United States Patent [19]

Dye

[11] Patent Number: 5,706,478
[45] Date of Patent: Jan. 6, 1998

[54] DISPLAY LIST PROCESSOR FOR OPERATING IN PROCESSOR AND COPROCESSOR MODES

[75] Inventor: Thomas Anthony Dye, Austin, Tex.

[73] Assignee: Cirrus Logic, Inc., Fremont, Calif.

[21] Appl. No.: 338,341

[22] Filed: Nov. 14, 1994

Related U.S. Application Data

[63] Continuation-in-part of Ser. No. 247,657, May 23, 1994.
[51] Int. Cl.$^6$ ....................................... G09G 5/00
[52] U.S. Cl. ....................................... 395/503
[58] Field of Search ................. 364/DIG. 1 MS File, 364/DIG. 2 MS File; 395/375, 800, 821, 825, 827, 118, 163, 830, 840, 842, 843, 844, 501, 502, 508, 503, 504; 273/435, 437; 345/112, 122; 463/44

[56] References Cited

U.S. PATENT DOCUMENTS 5,388,841  2/1995  San et al. ........................... 273/435

OTHER PUBLICATIONS

*Texas Instruments TMS34010 User's Guide*, 1988, pp. 1-1-4-17.

Primary Examiner—Robert B. Harrell
Attorney, Agent, or Firm—Gary R. Stanford; Steven A. Shaw

[57] ABSTRACT

A processor for executing display list command packets in processor or coprocessor mode of execution. The processor dynamically switches between the two modes based on the commands or interrupts received. Each display list packet includes a plurality of commands associated with a particular function, where each command includes a field for identifying the number of parameters associated with the command, if any. The parameters immediately follow the instruction in the instruction stream in a sequential format, eliminating address dependency. Each command preferably conforms to the same format regardless of location and mode of execution, so that the software and driver is simplified by not having to generate different code for different locations and modes. Thus, a host CPU executing an application program decides whether certain commands and command packets reside in system memory or within a local memory associated with the processor. The host CPU feeds commands to the processor in a coprocessor mode or sends an instruction commanding the processor to switch to processor mode and begin locating and executing commands. An idle instruction within the instruction stream places the processor back into coprocessor mode. In a graphics subsystem implemented according to the present invention, for example, a graphics processor executes display list packets associated with real-time graphics functions loaded into a private memory. Other, less time dependent commands may be fed by the host CPU or a DMA device to the graphics processor operating in coprocessor mode.

24 Claims, 10 Drawing Sheets

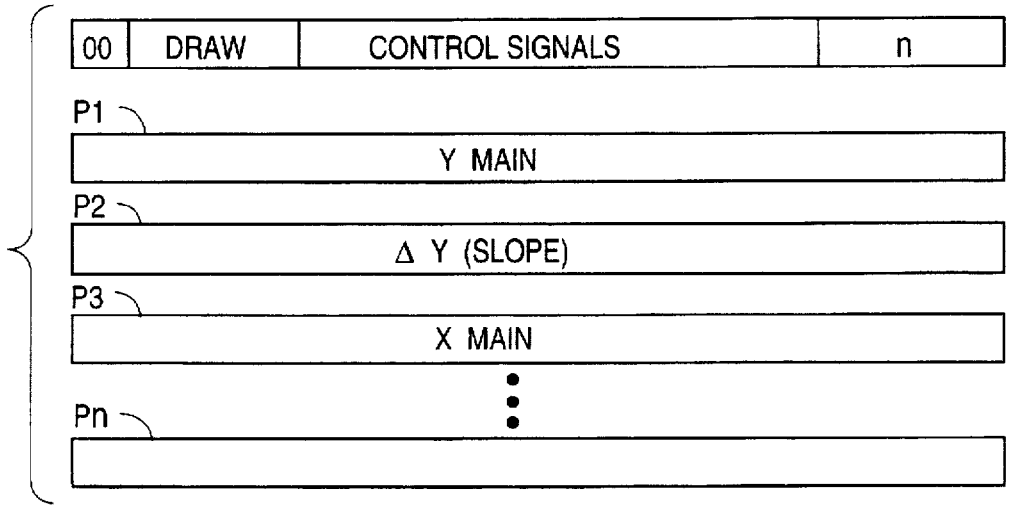

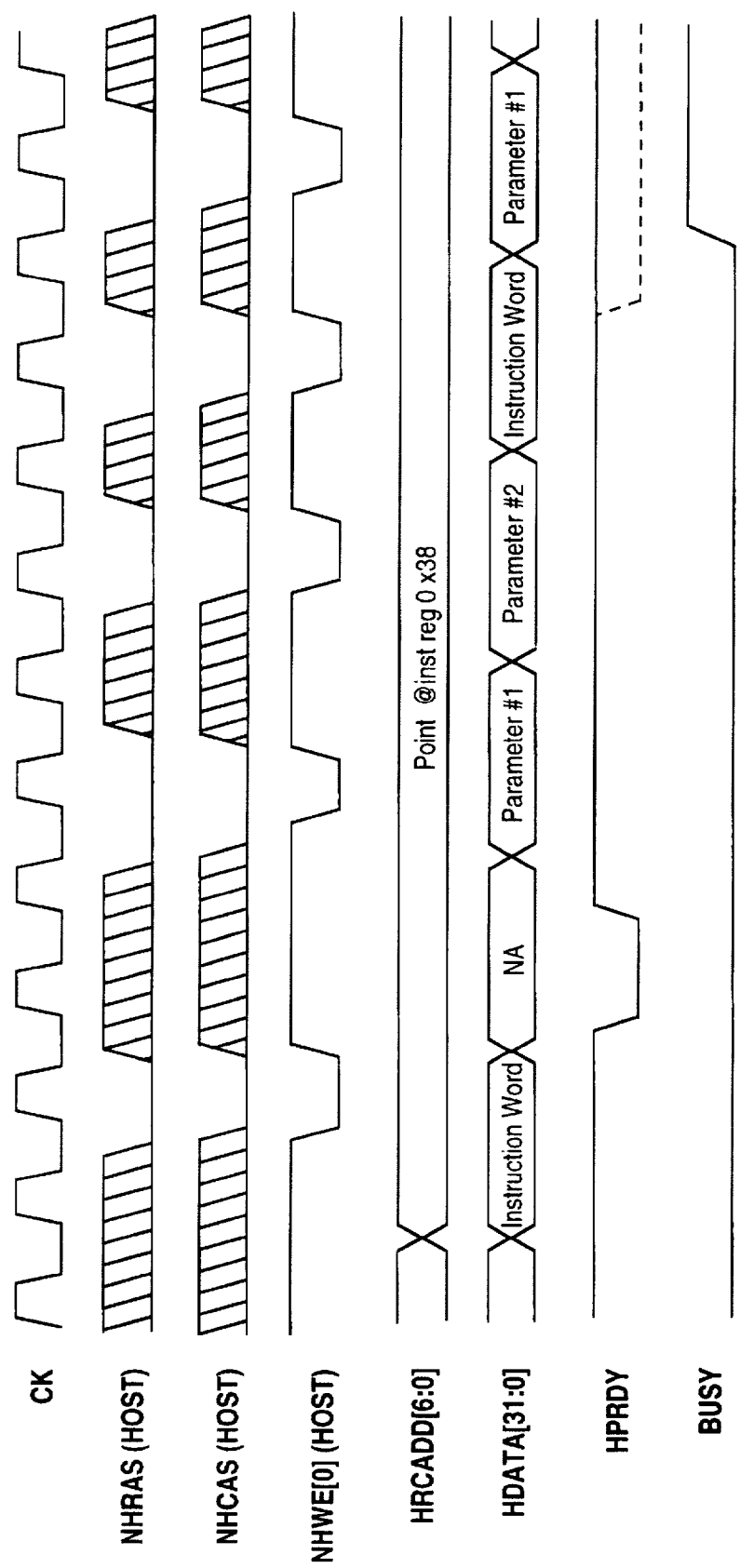

DISPLAY LIST PROCESSOR FOR OPERATING IN PROCESSOR AND COPROCESSOR MODES

CROSS-REFERENCES TO RELATED APPLICATION

This is a continuation-in-part of co-pending application Ser. No. 08/247,657 filed on May 23, 1994 entitled "Dynamic Pipeline for a Processor."

FIELD OF THE INVENTION

The present invention relates to methods of processing, and more particularly to a processor for executing display list packets in both processor and coprocessor modes.

DESCRIPTION OF THE RELATED ART

The advent of substantial hardware improvements combined with standardized graphics languages has allowed the use of complex graphics functions in even the most common applications. For example, word processors, spread sheets and desktop publishing packages are now beginning to take full advantage of the improvements in graphics capabilities to improve the user interface. Although sophisticated graphics packages have been available for computer aided drafting, design and simulation for some time, three-dimensional (3D) displays are now common in games, animation, multimedia communication and drawing packages designed for personal computers.

It is evident that the demand for greater graphic capabilities has increased dramatically. Thus, graphic system must be capable of performing more sophisticated functions in less amount of time in order to process greater amounts of graphical data required by modern software applications. There is a continuing need for improvements in software algorithms and hardware implementations to draw three-dimensional objects using full color, shading, texture mapping, and transparency blending.

The development of raster display systems dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube or LCD display or the like capable of scanning the entire pixel grid at a relatively high rate to reduce flicker as much as possible. The pixel data is preferably stored in a frame buffer comprising dynamic random access memories (DRAMs), or more preferably video RAMs (VRAMs), where each pixel is represented by one or more bits depending upon the desired resolution. Typical display systems can draw screens with multiple colors at a variety of screen resolutions, such as 640×480, 800×600, 1024×768, 1280×1024 or more pixels depending upon the software drivers and the hardware used.

A video controller scans and converts the pixel data in the frame buffer to the control signals required by the screen system to display the information on the screen. In particular, the video controller scans each of the pixels sequentially, preferably from top to bottom and from left to right, and converts pixel data into intensity values for corresponding pixels on the screen. In a color graphics system using a CRT, three separate beams are controlled for each of the primary colors, where the intensity of each of the beams is determined by the pixel value corresponding to the respective colors. A similar system is used for LCD displays. In the preferred embodiment, each pixel value comprises 24 bits, one byte for each of the primary colors red, green, and blue, where the byte number determines the intensity of the respective color.

Improvements have been made in the hardware realm, including graphics processors and accelerators with corresponding software drivers where the drivers provide an interface between the host central processing unit (CPU) and the graphics processor. There has also been an advance in graphics software such as the development of graphics standards. In particular, 3D core graphics system (CORE) was produced by ACM SIGGraph Committee in 1977. Subsequently, the graphics kernel system (GKS), similar to CORE, became the first standardized graphics specification. Other more sophisticated standards developed, such as programmer's hierarchical interactive graphics systems (PHIGS). PHIGS has been extended with a set of features for pseudo-realistic rendering of objects on raster displays, called PHIGS-plus. Another graphics package developed called SPHIGS (simple PHIGS), which is a subset of PHIGS that supports some of the simpler PHIGS-plus features.

The predominant video standards include the video graphics array (VGA) and the super VGA (SVGA) which was primarily achieved using graphics accelerators. An accelerator was initially little more than a timing generator for the display where the host central processing unit (CPU) performed the primary graphics functions. The accelerator included x,y registers and a data port so that the CPU had to provide all the addresses and data for the display. Eventually, accelerators included simple functions such as bit block transfers or "bit blits" and even line draw commands for manipulating data within the frame buffer. Nonetheless, such accelerators required a significant level of bandwidth across the bus to transfer data and commands. The data included either pixel data or relatively low level commands so that the ratio between the resulting pixel data to the frame buffer and the data across the bus was relatively low, tending to slow down data transfers to the graphics interface.

One technique for improving the graphics interface was to use a small first-in, first-out buffer (FIFO) which typically included up to 32 bytes of data. The FIFO allowed some level of concurrency, but once the FIFO was full, the CPU was once again forced into wait states. Even if the graphics accelerator were capable of operating at high speeds required for 3D animation, the integrated system architecture (ISA) bus typically found on most personal computer systems was too slow to allow sufficient data transfer. The ISA bus operates at a maximum of about 8 MHz and can only transfer data at a rate of about 2 Megabytes (MB) per second.

Graphics coprocessors have also been used which operate under the principle of command level interface, where the host CPU or other bus master feeds individual graphics commands directly into the registers of the coprocessor. Such coprocessors still operate with a relatively low level of concurrency with respect to the CPU, so that the host CPU experiences a significant number of wait states waiting for the graphics coprocessor to complete its present operation. In particular, the host CPU loads one command and attempts to load additional commands and parameters into the graphics coprocessor, but since the graphics coprocessor is busy, it asserts a signal forcing the CPU into wait states. Thus, the CPU experiences a significant number of wait states and can only load the next command and parameters when the graphics coprocessor has completed the present command.

Graphics coprocessors are typically address dependent, where an address always had to be provided along with the data to indicate which register of the coprocessor was to receive the data. Such address dependency significantly increased the amount of data associated with graphics commands thereby slowing the system bus and graphics interface.

Graphics processors are also available, such as the TMS34010 and TMS34020 processors by Texas Instruments. Such processors operate exclusively as processors and thus require a separate dedicated memory for storing instructions and data. The host CPU could not feed commands and data directly to the graphic subsystem, but instead had to execute special software function calls. In particular, a special set of software development tools were required for the particular processor resulting in substantial development cycle times and costs. Sophisticated graphic functions and operations, such as polygon drawing and filling and texture mapping, required separate software subroutines to be written for execution by the subsystem processor. Thus, application programs had to include embedded code for providing commands to the subsystem processor.

It is therefore desirable to provide improved graphics interface and capabilities for computer systems, particularly personal computer systems. It is desired to substantially increase the speed of the graphics without requiring separate development for the graphics interface.

SUMMARY OF THE INVENTION

A processor according to the present invention executes display list commands in processor or coprocessor mode and dynamically switches between these two modes. Each display list command conforms to a single format regardless of whether the processor is operating in the processor mode or coprocessor mode. This uniform format significantly simplifies the command protocol, thereby eliminating the need for multiple types of commands. A display list command packet generally comprises multiple commands or instructions, where each instruction may include one or more command parameters. The number of parameters following a particular command is provided within the command itself. The list of sequential commands forming a display list packet is typically associated with a particular graphics function or operation.

The display list packet format allows dynamic allocation to switch between processor and coprocessor modes through a handshaking protocol between the processor and the host CPU, thereby facilitating concurrent execution. Such dynamic switching occurs automatically based on the instruction stream formed by the display list protocol. For example, the host CPU can feed the processor a branch instruction while in coprocessor mode, which causes the processor to automatically switch to processor mode and begin executing instructions at a new display list packet indicated by the branch instruction. An idle instruction encountered in the instruction stream forces the processor back into coprocessor mode. Effectively, a processor implemented according to the present invention operates like an embedded processor to the host CPU, so that software need only be developed for the host CPU, which can determine the level of control of the "embedded" processor.

In the preferred embodiment, the host CPU executes an application program which further calls a software driver associated with a graphics processor implemented according to the present invention. The application program and software driver build the display list packets and either the CPU or a direct memory access (DMA) device typically provided in a computer system transfers selected ones of the display list packets to the graphics subsystem. The graphics subsystem preferably includes a local or private memory attached to a host interface bus further coupled to the graphics processor. In this manner, parallel or concurrent execution is facilitated since the host CPU builds new display list packets while the DMA device transfers completed commands to the graphics subsystem and while the graphics processor executes commands from the private memory.

The application software and/or the driver code has complete control and places each display list packet at any convenient location depending upon the level of access and speed required. Multiple display list packets are formed where each packet is associated with a particular function, and where the packets are linked together depending upon operation desired. In this manner, those command packets requiring real time or relatively fast execution and access, such as draw routines, save context lists, pop-down menus or cursor control are transferred to the private memory and executed by the graphics processor directly while in processor mode. The processor mode is advantageous for high speed execution required for 3D animation. Other command packets, such as associated with fonts or image rotation operations, etc., which are not operated in real time or which are not time-critical commands remain in system memory and are fed to the graphics processor while operating in coprocessor mode. The use of uniform, location-independent display list commands eliminate the need to construct different types of commands based on execution mode or location.

The use of display list command packets provide three-dimensional (3D) animation capabilities even for ISA bus systems with low bandwidth capability. Each display list command is implemented using a mathematical protocol where a relatively small number of parameters or data is transferred across the bus and stored in private memory or otherwise loaded into the graphics processor. The display list commands include a set of drawing instructions for lines, triangles, polygons, etc. and include a set of initial and slope parameters for drawing the particular graphics element. The graphics processor executes drawing commands by interpolating the initial and incremental or slope values, thereby generating a significant amount of pixel data as compared to the number of bytes comprising the draw command itself. Thus, there is a high ratio of the number of pixels generated relative to the number of bytes in the corresponding command.

The structure of each display list packet allows address independence. A list of commands is provided sequentially, where each command generally includes a parameter field identifying the number of parameters associated with and immediately following the command in the instruction stream. The graphics processor can easily determine the location or position of the next command in the instruction stream, thereby eliminating the need for providing separate addresses per command.

A graphics processor according to the present invention thereby provides high level graphic capabilities including 3D animation even on relatively simple computers, such as low end personal computer systems. In a graphics system according to the present invention, application software or a graphics driver builds display list packets for providing complete control over graphics functions. Each display list command or entire command packet can be executed by the graphics processor in processor or coprocessor mode, depending upon the needs of the application software.

BRIEF DESCRIPTION OF THE DRAWINGS

A better understanding of the present invention can be obtained when the following detailed description of the preferred embodiment is considered in conjunction with the following drawings, in which:

FIG. 4 is a diagram illustrating the general format of instructions for graphics processor of FIG. 1;

FIGS. 5, 6, 7, and 8 illustrate particular instruction formats for the graphics processor of FIG. 1;

FIGS. 15 and 16 are more accurate timing diagrams provided for purposes of illustration.

DETAILED DESCRIPTION OF THE PREFERRED EMBODIMENT

Figure 1:
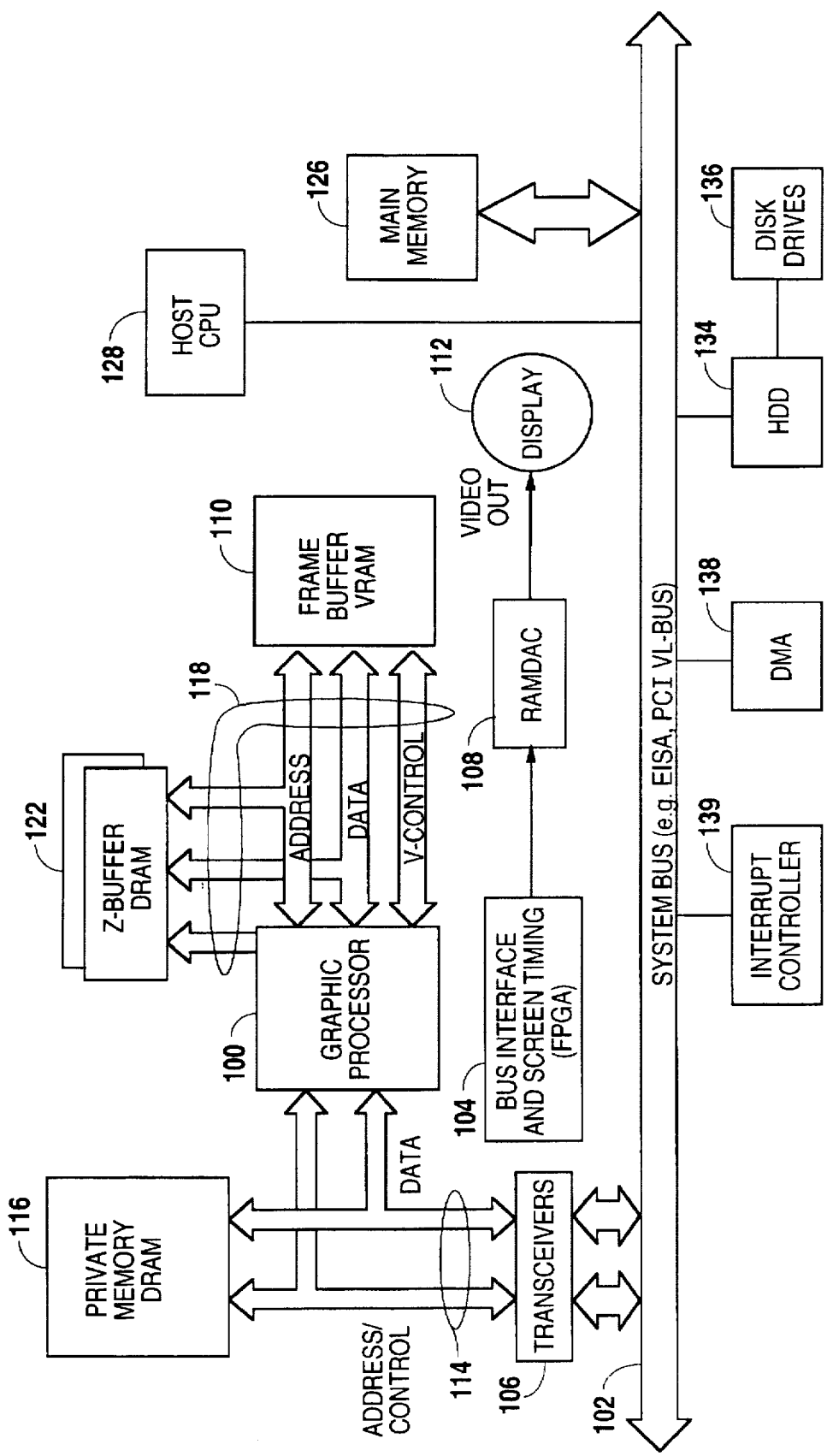
FIG. 1 is a simplified block diagram of a graphics system coupled to a system bus of a host computer system, where the graphics system includes a graphics processor implemented according to the present invention.

Referring now to FIG. 1, a simplified block diagram is shown of a graphics system coupled to a system bus 102 of a host computer system, where the graphics system includes a graphics processor 100 implemented according to the present invention. The system bus 102 is any one of a plurality of different types of host or input/output (I/O) buses, including the industry standard architecture (ISA), the extended ISA (EISA), the peripheral component interconnect (PCI), the video electronic standard association (VESA) local bus or the VL-bus, or any other standardized system bus of a computer system. The system bus 102 could comprise a separate local processor or system bus coupled to an expansion bus through a bus controller as known to those having skill in the art, although particular configurations are not shown for purposes of simplification. If the expansion bus is an ISA or EISA bus, it operates at a maximum of about 8 megahertz (MHz). The graphics processor 100 is preferably a 32-bit graphics processor operating at a frequency of 33 MHz and is coupled to the system bus 102 through bus interface and screen timing logic (FPGA) 104. Of course, lower or higher operation frequencies are achievable and contemplated. The FPGA 104 is used to control a set of transceivers 106 and a random-access memory digital-to-analog converter (RAMDAC) 108, where it interfaces to the system bus 102, controls the decoding of cycles to the RAMDAC 108 and determines video timing.

The RAMDAC 108 receives digital data stored in a frame buffer 110 and converts the digital data to the appropriate analog outputs required by a display unit 112. In the preferred embodiment, the frame buffer 110 is part of a raster display implemented in a video RAM (VRAM), where the digital data comprises a rectangular array of picture elements referred to as pixels or pixel values. Each pixel value is preferably 8 bits for defining the intensity of a single color of a corresponding pixel on a screen of the display unit 112. However, either three passes are made or three parallel logic slices are implemented for the three primary colors to achieve 24-bit pixel values for full color display. The frame buffer 110 stores pixel values for a 4096×4096 screen size or 16 Megabytes (MB) of memory. The display unit 112 may be any type, such as a cathode ray tube (CRT) for desktop, workstation or server applications, or a liquid crystal display (LCD) or the like commonly used for portable computers.

The transceivers 106 are used to interface the graphics processor 100 with the system bus 102 through address, data and control signals, collectively referred to as the HBUS 114, which is further connected to an optional private memory 116. Although referred to as the "host" bus, the HBUS 114 is local to the graphics processor 100 and can operate independently of the system bus 102 due to the isolation provided by the transceivers 106. The address portion or host address bus is preferably 12 bits, although these signals are asserted as row and column signals for addressing 8 MB worth of memory. The host data bus is 32 bits in length for transferring 4 bytes at a time, equivalent to one 32-bit instruction or 4 pixels. In the preferred embodiment, the private memory 116 acts as a virtual frame buffer, display list storage, texture map, and bit mapped font storage memory to improve performance and functionality of the graphics system. The private memory 116 is preferably added as a separate bank of external dynamic RAMs (DRAMs) for providing a performance improvement by permitting faster access to display list instructions and pixel data compared to data stored in a main memory 126. A memory system 127 preferably comprises a memory controller 125 coupled to the system bus 102 and also coupled to the main memory 126, which comprises at least 4 MB, but preferably comprises 16 or 32 MB or more worth of data. The private memory 116 is preferably up to 8 MB for achieving a 2048×2048 byte pseudo-display, or for storing up to 8 MB worth of instructions and data.

The graphics processor 100 communicates to the frame buffer 110 through address, data and control lines, collectively referred to as the LBUS 118, which is further connected to a Z-buffer 122, also preferably implemented using DRAMs. The local address bus is preferably 14 bits for addressing the pixels of the frame buffer 110. The local data bus is preferably 32 bits in length for transferring one word or 4 pixels at a time. Throughout this disclosure, a word is equal to 4 bytes or 32 bits. The Z-buffer 122 is preferably used to implement a depth buffer for three-dimensional (3D) graphic displays, where each depth value is preferably 16 bits. Separate control signals of the LBUS 118 are also connected between the graphics processor 100 and the Z-buffer 122, as will be described more fully below. The host computer system preferably includes a central processing unit (CPU) 128 for executing various software programs, which are loaded into the main memory 126 from a permanent magnetic storage device, such as hard disk drives 136 or floppy disk drives (not shown), and executed by the CPU 128, although other similar configurations are possible. Also shown is a hard disk drive controller (HDD) 134 connected to the system bus 102 for connecting to the hard disk drives 136, and a direct memory access device (DMA) 138 coupled to the system bus 102 for controlling DMA data transfers between the hard disk drive 136, the main memory 126 and the private memory 116. An interrupt controller 139 is provided and coupled to the system bus 102 for allowing the host CPU 128 and the graphics processor 100 to interrupt each other.

It is understood that the particular embodiment shown in FIG. 1 is only one of many possible implementations of a graphics system for use in a personal computer system. FIG. 1 is simplified for purposes of clarity, and many control signals are not shown. In the preferred embodiment, the graphics processor 100 provides hardware support for 2D and 3D graphics, text and windowing operations of a computer system. The graphics processor 100 transfers digital data between the main memory 126, the private memory 116, the frame buffer 110 and the Z-buffer 122, and processes the data for storage in the frame buffer 110 for ultimate display on the display device 112.

Figure 2:
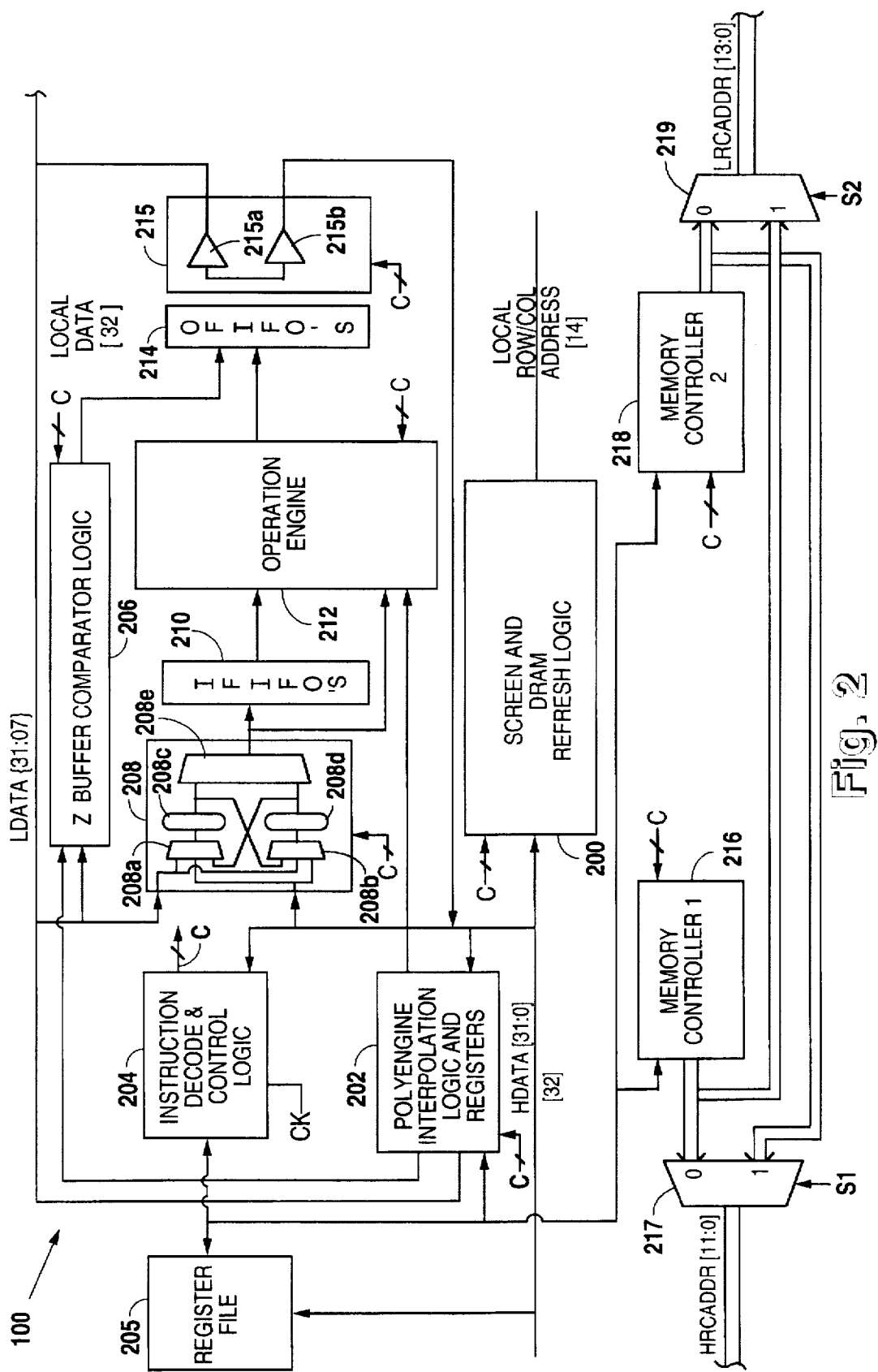
FIG. 2 is a simplified block diagram of the graphics processor of FIG. 1.

Referring now to FIG. 2, a simplified block diagram of the graphics processor 100 is shown. The host data bus of the HBUS 114, comprising the signals HDATA[31:0], is connected to screen and refresh logic 200, an interpolation engine and associated registers (polyengine) 202, instruction decode and control logic 204, a register file 205 and pixel alignment logic 208. The HBUS 114 also preferably includes a 33 MHz clock signal CK, which synchronizes data flow and logic within the graphics processor 100. The clock signal CK is preferably the same or based on the clock signal of the host CPU 128 and associated with the system bus 102. Of course, if an ISA or EISA expansion bus would operate at slower speeds and would be separated from the system bus 102 by a bus controller as known to those skilled in the art. The screen and refresh logic 200 provides row and column address signals to the frame buffer 110 and to the Z-buffer 122 during refresh cycles. The polyengine 202 preferably receives and stores vector data or parameters from the register file 205 for points, lines, polylines, polygons, and other geometric quantities, and then calculates or otherwise interpolates pixel position, color intensity, depth and transparency or alpha-blending for the various geometric quantities and characteristics. The polyengine 202 also determines address values for bit-block data transfer operations and provides color intensity values and depth values to an operation engine 212.

The register file 205 is preferably a set of 64 to 128 registers forming a read/write pre-storage and instruction queuing buffer for storing data and commands. A portion of the register file 205 is shown below in Table 1 for purposes of full disclosure:

TABLE 1

| Register Set for the Graphics Processor 100 | |
|---|---|
| Register Name | Port Address |
| Pattern RAM | 00–07h |
| Color & Alpha | 08h |
| Offsets | 09h |
| Color Bound High | 0Ah |
| Color Bound Low | 0Bh |
| Pmask | 0Ch |
| Dash | 0Dh |
| Disable | 0Eh |
| Reserved | |
| Refresh register 0 | 10h |
| Refresh register 1 | 11h |

TABLE 1-continued

| Register Set for the Graphics Processor 100 | |
|---|---|
| Register Name | Port Address |
| Refresh register 2 | 12h |
| Refresh register 3 | 13h |
| Refresh register 4 | 14h |
| Refresh register 5 | 15h |
| Refresh register 6 | 16h |
| Refresh register 7 | 17h |
| Refresh register 8 | 18h |
| Refresh register 9 | 19h |
| Refresh register A | 1Ah |
| Refresh register B | 1Bh |
| Refresh register C | 1Ch |
| Refresh register D | 1Dh |
| Refresh register E | 1Eh |
| Refresh register F | 1Fh |
| Control | 20h |
| Mask | 22h |
| Status | 24h |
| Register File: Y Main | 28h |
| Register File: Y Slope | 29h |
| Register File: X Main | 2Ah |
| Register File: X Slope | 2Bh |
| Register File: Z Main | 2Ch |
| Register File: Z Slope | 2Dh |
| Register File: I Main | 2Eh |
| Register File: I Slope register | 2Fh |
| Register File: Main Width | 30h |
| Register File: Delta Main Width | 31h |
| Register File: Opposite Width | 32h |
| Register File: Delta Opposite Width | 33h |
| Register File: Z Error | 34h |
| Register File: Z Ortho | 35h |
| Register File: I Error | 36h |
| Register File: I Ortho | 37h |
| Register File: A Ortho | 38h |
| Register File: A Main Slope | 39h |
| Host Pitch | 3Ah |
| Host Instruction | 3Bh |
| Host Base | 3Ch |
| Host Offset | 3Dh | where a lowercase "h" following the port address denotes hexadecimal notation. The registers of the register file 205 are connected and accessible to the control logic 204 and the polyengine 202. Instructions are loaded into the instruction register at address 3Bh and associated parameters are loaded into associated ones of the remaining registers depending upon the indicated instruction.

The operation engine 212 generally performs alpha blending functions, color logic operations as well as compare and masking functions. The instruction decode and control logic, or simply the control logic 204, provides control signals, generally referred to by the letter C, to all of the functional blocks described herein of the graphics processor 100. Graphics instructions are either read by the graphics processor 100 from the private memory 116 or main memory 126 and loaded into an instruction queue (not shown) and then into an instruction register within the register file 205 in a processor mode of operation, or are directly loaded by an external device such as the CPU 128 or the DMA 138. The control logic 204 then executes the instruction by asserting the necessary control signals C for determining synchronization and data flow according to the particular instruction.

The pixel alignment logic 208 includes two three-input multiplexors 208a, 208b each having two inputs coupled to the host data bus and local data bus, and outputs coupled to the inputs of two registers 208c, 208d, respectively. The output of the register 208c is provided to the third input of mux 208b and to one input of a two-input barrel shifter 208e.

The output of the register 208d is provided to the third input of the mux 208a and to the other input of the barrel shifter 208e, having its output providing output pixel values to a set of input first-in, first-out latches (IFIFOs) 210 and also directly to the operation engine 212. The muxes 208a, 208b allow the graphics processor 100 to receive data from either the host or local data buses, or a combination thereof. The barrel shifter 208e allows alignment of pixel data as desired.

The local data bus of the LBUS 118 is provided to Z-buffer comparator logic 206 and also to the pixel alignment logic 208. The Z-buffer comparator logic 206 is generally used for 3D operations for controlling the data to be displayed in overlap or transparency situations. Depth data values stored in the Z-buffer 122 are compared with depth values interpolated by the polyengine 202. The outputs of the Z-buffer comparator logic 206 and the operation engine 212 are provided to output FIFOs (OFIFOs) 214. The outputs of the OFIFOs 214 are provided to the inputs of set of buffers 215, comprising a first set of tri-stateable buffers 215a for providing outputs to the local data bus, and a second set of tri-stateable buffers for providing outputs to the host data bus. The IFIFOs 210 and the OFIFOs 214 decouple the dynamic interface of the memories 110, 116 and 122, and the IFIFOs 210 synchronize source data for the operation engine 212 for read-modify-write (RMW) operations. The buffers 215a, 215b allow data from the OFIFOs 214 to be provided to the local data bus, the host data bus, or both. The muxes 208a, 208b and the tri-stateable buffers 215a, 215b allow complete flexibility of data flow between the LBUS 118 and HBUS 114, so that data can be transferred from the private memory 116 to the frame buffer 110 or the Z-buffer 122, and vice versa.

A first memory controller (MC1) 216 provides address signals to one input of a two input bus multiplexor (mux) 217 and to one input of another two-input bus mux 219. The output of the mux 217 is connected to the host address bus of the HBUS 114 for asserting address signals to the private memory 116 and the transceivers 106. A second memory controller (MC2) 218 provides address signals to the second inputs of the muxes 217, 219. The output of the mux 219 is connected to the local address bus of the LBUS 118 and provides address signals to the Z-buffer 122, the FPGA 104 and the frame buffer 110. The select inputs of the muxes 217, 219 receive signals S1, S2, respectively, provided from the control logic 204. In general, the graphics processor 100 operates in either a coprocessor or processor mode where the CPU 128 or the graphics processor 100, respectively, controls the HBUS 114 for providing data and instructions to the graphics processor 100 for execution. A coprocessor mode is thus implemented where an external device such as the host CPU 128 asserts address signals to the graphics processor 100 for accessing and loading instructions and parameters into the register file 205. The registers of the register file 205 are preferably connected and accessible to the memory controllers MC1 216, MC2 218. Although not explicitly shown, the control logic 204 asserts the C control signals to cause the mux 217 to tristate its outputs in coprocessor mode to allow an external device, such as the host CPU 128 or the DMA device 138 to control the HBUS 114. In processor mode, the mux 217 of the graphics processor 100 asserts addresses to obtain data or instructions and parameters from the private memory 116 or the main memory 126, depending upon system configurations.

Figure 3:
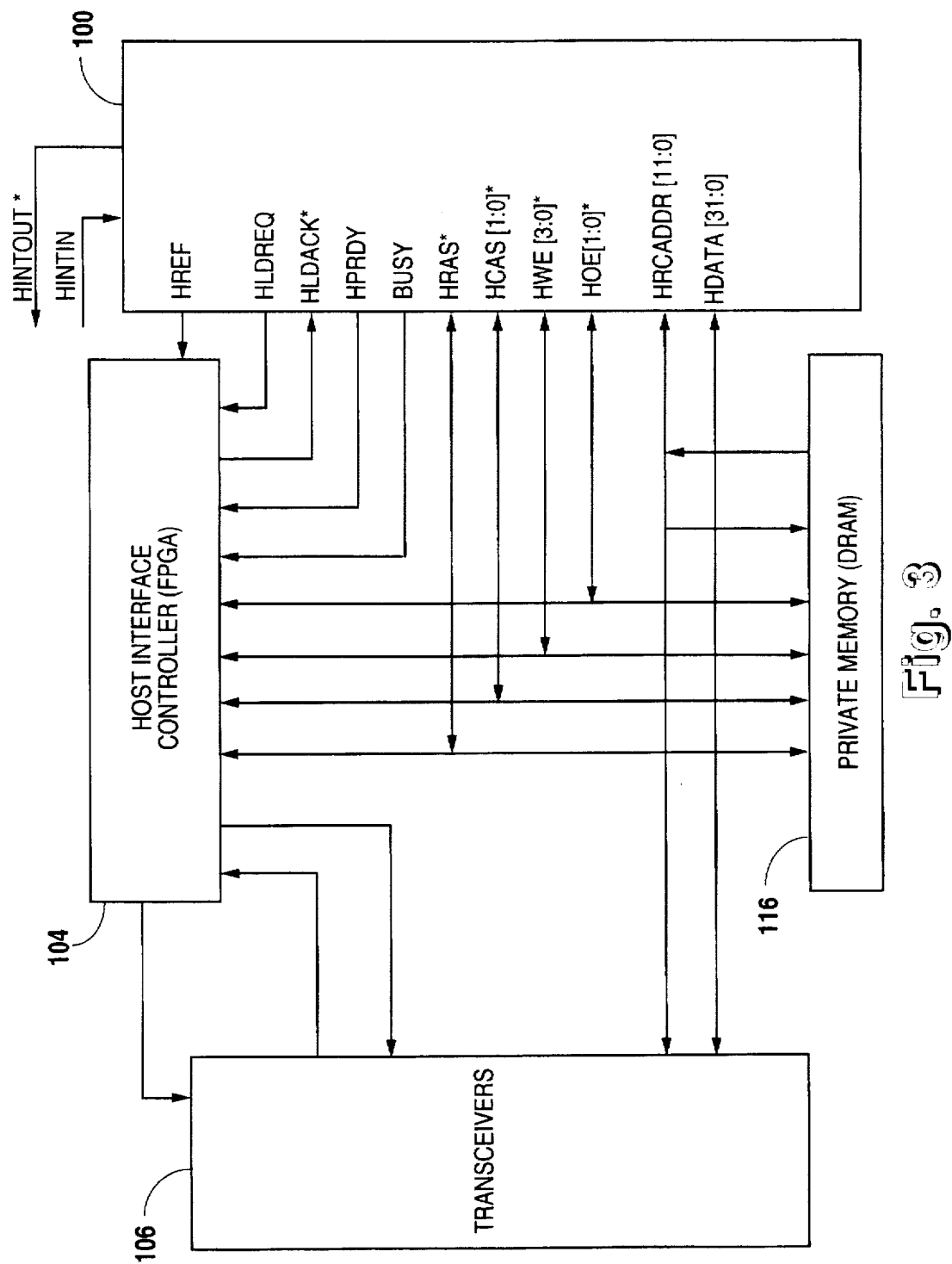
FIG. 3 is a more detailed block diagram illustrating the signal connections of the local bus associated with the graphics processor of FIG. 1.

Referring now to FIG. 3, a more detailed block diagram is shown illustrating the signal connections between the graphics processor 100, the transceivers 106, the FPGA 104 and the private memory 116. Although the host address bus signals are asserted directly by the mux 217, it is understood that these signals are indirectly asserted by the MC 1216 or the MC2 218 depending upon the S1 or S2 signals. In the preferred embodiment, the memory controllers MC 1216 and MC2 218 are implemented as state machines within the control logic 204, although they are shown separated for purposes of illustration. The various control signals described herein related 19 the address signals are generally asserted by the control logic 204, although they will be referred to as being asserted generally by the graphics processor 100.

A host DRAM refresh signal, referred to as HREF, is asserted by the graphics processor 100 to the FPGA 104 indicating that the graphics processor 100 requires access to the HBUS 114 to either perform DRAM refresh cycles of the private memory 116, or otherwise to indicate that such cycles are already in progress. A host interface hold request signal, referred to as HLDREQ, is asserted by the graphics processor 100 to the FPGA 104 to indicate that the graphics processor 100 desires control of the HBUS 114. Correspondingly, the FPGA 104 asserts a host interface hold acknowledge signal, referred to as HLDACK*, which indicates that the host computer system has granted control of the HBUS 114 to the graphics processor 100. An asterisk (*) at the end era signal name denotes *negative logic where the signal is normally considered asserted when low or at logical zero and negated when high or at logical one. Otherwise, signal names generally conform to positive logic where the signal is asserted when high and negated when low. The HLDREQ and HLDACK* signals are used by the graphics processor 100 to arbitrate for control of the HBUS 114, where the graphics processor 100 drives the HBUS 114 when both the HLDREQ and HLDACK* signals are asserted.

A host port ready signal, referred to as HPRDY, is asserted by the graphics processor 100 to the FPGA 104 to indicate to the host computer system that the graphics processor 100 is ready to accept another instruction. The HPRDY signal is primarily used for a coprocessor mode, since otherwise the graphics processor 100 fetches the next instruction from either the main memory 126 or from the private memory 116. A BUSY signal is asserted by the graphics processor 100 to the FPGA 104 to indicate that the graphics processor 100 is busy executing an instruction. The BUSY signal in combination with the HPRDY signal indicates the state of the instruction prefetch queue within the instruction decode and control logic 204. A signal HINTIN* is asserted by an external device, such as the CPU 128 or the interrupt controller 139 to indicate that the host system or CPU 128 wants to interrupt the graphics processor 100 to stop processor mode instruction flow and gain access to the HBUS 114. A signal HINTOUT* is asserted by the graphics processor 100 to indicate that an enabled internal interrupt event has occurred, such as when an interrupt instruction is encountered or that the HINTIN* signal has been asserted.

A host row address strobe signal, referred to as HRAS*, is connected between the graphics processor 100, the FPGA 104 and the private memory 116, and is asserted when a valid row address has been driven onto the HBUS 114. The HRAS* signal is input to the graphics processor 100 when the HLDREQ signal is negated and is provided by the graphics processor 100 when both the HLDREQ and HLDACK* signals are asserted. Two host column address strobe signals referred to as HCAS[1:0]* are connected between the graphics processor 100, the FPGA 104 and the private memory 116, which are asserted to indicate that a valid column address has been driven onto the host address bus, comprising individual bus signals HRCADDR[11:0]. Preferably, two signals are provided for increased output drive capability, although they will collectively be referred to as the HCAS* signal. The HCAS* signal is provided to the graphics processor 100 from an external device when the HLDREQ signal is negated and are asserted by the graphics processor 100 when both the HLDREQ and HLDACK* signals are asserted. The HRAS* and HCAS* signals are bi-directional signals driven by an external controller to address the graphics processor 100 for reads and write cycles or for instruction loading when the HLDREQ signal is negated. These signals are driven by the graphics processor 100 to access instructions or data from the main memory 126 or from the private memory 116.

Four host write enable signals, referred to as HWE[3:0]*, are individual write enables for each byte of the host data bus of the HBUS 114, comprising individual bus signals HDATA[31:0]. The HWE[3]*, HWE[2]*, HWE[1]*, HWE[0]* signals correspond to the HDATA[31:24], HDATA[23:1 7], HDATA[16: 8] and HDATA[7:0] signals, respectively. Two host output enable signals, referred to as HOE[1:0]*, are provided to the graphics processor 100 by an external device when the HLDREQ signal is negated, which causes the graphics processor 100 to provide data on the HDATA [31:0] signals. Again, two identical signals are preferably provided for increased drive capability, although they will be collectively referred to as the HOE* signal. The HOE* signal is asserted by the graphics processor 100 when both the HLDREQ and HLDACK* signals are asserted to access instructions or data from an external memory, such as the main memory 126 or the private memory 116. The HWE [3:0]* and the HOE* signals are bi-directional host write and output enable signals to allow an external controller of the HBUS 114 to access the registers of the graphics processor 100 or for loading instructions and parameters into the graphics processor 100. These signals also allow the graphics processor 100 to access instructions or data from the main memory 126 or from the private memory 116.

The host address bus of the HBUS 114 comprising signals HRCADDR[11:0] are bi-directional host row and column address signals driven by an external controller, such as the host CPU 128, to address the registers of the graphics processor 100 for reads and writes or for instruction and parameter loading when the HLDREQ signal is negated. When both the HLDREQ and HLDACK* signals are asserted, the HRCADDR[11:0] signals are driven by the mux 217 of the graphics processor 100 to access instructions or data from the main memory 126 or from the private memory 116. To achieve a full address, a row address is asserted on the HRCADDR[11:0] signals and the HRAS* signal is asserted to precharge the DRAMs, and then a series of column addresses are asserted on the HRCADDR[11:0] signals and the HCAS* signal is strobed accordingly. In the preferred embodiment, the graphics processor 100 is connected to the host computer system through the transceivers 106 and is directly connected to the DRAMs of the private memory 116. The host data bus transfers data and instructions to and from the host computer system, which includes the host CPU 128 and the main memory 126. The controller of the host data bus changes on a cycle to cycle basis depending upon the mode of the graphics processor 100, and whether data is being read or written.

Referring now to FIG. 4, a diagram is shown illustrating the general format of instructions for the graphics processor 100, which are sequentially loaded into the register file 205 and then executed. All instructions are preferably 32 bits in length, having a least significant bit 0 and a most significant bit 31, and the instruction bits will be referred to as I[31:0]. Each instruction is separated into a plurality of fields to identify the particular operation to be performed. Six separate fields are defined, including fields O, P, N, Z, M and A, where a number below the lower left-hand corner of the respective fields indicates the most significant bit of each field. Not all fields are used for each instruction, where the field definitions may change depending upon the particular instruction. The O field is referred to as the opcode field comprising 8 bits I[31:24] for identifying the particular type of command within one of four separate groups of commands, as shown in Table 2 below. The P field comprises 2 bits I[23:22] for identifying the number of pipeline stages within the operation engine 212 for carrying out a particular function within the operation engine 212. The operation engine 212 includes a dynamic pipeline preferably including 1, 2 or up to 3 separate stages depending upon the bits in the P field. The N field is a 6-bit field comprising bits I[21:16] for specifying the source of color and alpha value operands for an arithmetic logic unit (ALU) located within the operation engine 212. The Z field comprising 2 bits I[15: 14] identifies whether the Z-buffer 122 is used or updated. The M field comprises 5 bits I[13:8] for identifying the particular operation performed by the ALU, which includes several logic operations, such as XOR, AND, NAND, etc. or arithmetic operations such as addition, subtraction, etc. Finally, the A field comprises the least significant 8 bits I[7:0] for specifying the number of immediate 32-bit operands or parameters immediately following the instruction in the instruction stream, which should be loaded into appropriate registers of the register file 205 before executing the instruction.

The following Table 2 illustrates the four primary instruction groups identified by the two most significant bits I[31:30] of the instruction register within the O field:

TABLE 2

| | | Instruction Groups | |
|---|---|---|---|
| I[31] | I[30] | Group | Instructions |
| 0 | 0 | 0 | Lines, Polylines, BitBLTs, Text |
| 0 | 1 | 1 | Instruction Flow, Store |
| 1 | 0 | 2 | Load Short |
| 1 | 1 | 3 | Load Long |

Each of these groups will now be further defined. In general, the group 0 instructions are drawing commands for drawing lines, polylines, polygons, performing bit block transfers (BitBLTs) and transferring text or other data groups. The group 0 instructions are further classified according to the next two most significant bits of the O field or the I[29:28] bits according to the following Table 3:

TABLE 3

| | | Instruction Group 0 Subgroups | |
|---|---|---|---|
| I[29] | I[28] | Subgroup | Instructions |
| 0 | 0 | 0 | Lines and Polylines |
| 0 | 1 | 1 | Polygon |
| 1 | 0 | 2 | BitBLT |
| 1 | 1 | 3 | String Text |

In this manner, if the I[31:28] bits of the O field of the instruction register are all 0's, then the instruction is for drawing lines or polylines, where more particular details are defined by the remaining bits and fields. Subgroups 1, 2 and 3 are for drawing polygons, performing BitBLT operations or transferring string text operations, respectively.

FIG. 5 illustrates the general format of draw commands of group 0. In the O field, bits I[31:30] are O's indicating a group 0 draw command and the remaining bits I[29:24] identify the particular draw command. The P, N, Z and M fields are filled with the particular control signals appropriate for the particular draw command indicated. The A field is filled with a number n indicating the number of parameters following the draw command for loading into respective registers beginning at address 28h of the register file 205. It is noted that the registers 28h–39h of the register file 205 are the appropriate parameters for drawing instructions. Thus, the parameters P1, P2, P3 . . . Pn following the draw instruction in the instruction stream are loaded into corresponding registers 28h, 29h, 2Ah, etc. of the register file 205. The A field is also used to determine where the next instruction is located in the private memory 116 or in the instruction stream for display list fetch. The next instruction follows the parameters. When the A field, or n, is zero, the instruction is immediately executed using the parameters pre-loaded into the register file 205. It is seen that this use of the A field facilitates address independence according to the present invention, since the instruction itself need not contain the address.

The group 1 instructions are provided for instruction flow and a store command and are summarized in the following Table 4:

TABLE 4

| Instruction Group 1 | |
|---|---|
| O-Field | Instruction |
| 40h | Return |
| 41h | Branch |
| 42h | Call |
| 43h | Start |
| 44h | Idle |
| 45h | Wait |
| 46h | Intout |
| 47h | Clear |
| 48h–4Eh | Unassigned |
| 4Fh | Flush |
| 050h–05Fh | Unassigned |
| 060h–07Fh | Store | where the small "h" again indicates a hexadecimal address.

FIG. 6 collectively illustrates the call, return, branch, start, idle and store instructions and fields thereof of the group 1 commands. The return instruction is used in conjunction with the call instruction, where the return instruction pulls the last program counter (PC) value from an internal stack (not shown) of the graphics processor 100 and continues execution from the indicated address of the PC value. The call and return instructions are typically executed while the graphics processor 100 is in processor mode. For the return instruction, the remaining instruction bits I[23:0] must be 0, so that the instruction value is 40000000h. The call instruction pushes the address of the next sequential instruction of the PC onto the internal stack and transfers to the specified address within the call instruction. The remaining 24 bits of the call instruction, or the bits I[23:0], identify the 24-bit address for the target instruction. In this manner, the call instruction is used in conjunction with the return instruction to implement a single level of subroutine or branching capability. Thus, the graphics processor 100 pushes the next sequential instruction into the internal stack and then begins execution at the 24-bit address within the call instruction, and when a return instruction is next encountered, the value in the internal stack is pulled off into the PC to return operation to the next sequential instruction.

The branch instruction includes an internal 24-bit address which specifies the address of the next instruction to be executed. Thus, the remaining 24 bits of the branch instruction, or bits I[23:0] specify the address of the target or next instruction. If the graphics processor 100 is already in processor mode, the branch instruction merely specifies the address of the next instruction to be executed. If the graphics processor 100 is idle, or otherwise in coprocessor mode, a branch instruction inserted into the instruction register of the register file 205 causes the graphics processor 100 to switch into processor mode, where the graphics processor 100 pulls the address from the branch command to address or locate the first instruction to be executed.

The start instruction is used to place the graphics processor 100 into processor mode when the graphics processor 100 is idle or has otherwise been halted while in processor mode. The remaining bits I[23:0] are 0 for the start instruction. The idle instruction places the graphics processor 100 into idle state from the processor mode. The store instruction allows I/O reads from the internal register file 205 and provides a mechanism for processor mode stores into the private memory 116. The store instruction includes an address of an internal register within the register file 205, as well as an address in the main memory 126 or in the private memory 116, depending upon the configuration of the system, which identifies the address where the store is to occur. The 3 most significant bits of the O field or I[31:29] is 011, indicating a store command, and the remaining five bits of the O field specify the address to the internal register of the register file 205 to be stored. The remaining bits I[23:0] specify a 24-bit address where the value from the internal register is to be stored in the private memory 116. Thus, the store instruction moves data from the internal register file 205 beginning with the indicated register address to external memory indicated by the 24-bit address. The remaining group 1 instructions will not be further described.

FIG. 7 illustrates the group 2 command or the load short instruction, which allows any of the 64 internal registers of the register file 205 to be loaded with any 24-bit value. A 6-bit address of the internal register within the register file 205 is provided within the instruction bits I[29:24] and the 24-bit data value is provided in bits I[23:0].

FIG. 8 illustrates the group 3 command or the load long instruction, which loads one or more entries into the register file 205 with 32-bit values taken from sequential and subsequent entries in the instruction stream. The first two bits I[31:30] are 11, respectively, indicating a group 3 instruction, and the remaining 6 bits of the O field specify the address of the first register within the register file 205 to begin loading. Since there are preferably internal registers of the register file 205, the instruction register bits I[23:8] are typically filled with zeros, and the 8-bit value n within the A field specifies the number of 32-bit values that immediately follow the load long instruction in the instruction stream. Thus, the load long instruction moves data in sequential increments for additional loads for n times.

The following Table 5 summarizes the instruction set for the graphics processor 100:

TABLE 5

Instruction Set Summary for the Graphics Processor 100

| 31 | 30 | 29 | 28 | 27 | 26 | 25 | 24 | 23 | 22 | 7 | A | Name | Parms | Note |
|---|---|---|---|---|---|---|---|---|---|---|---|---|---|---|
| 0 | 0 | 0 | 0 | 0 | 0 | X | 0 | x | x | 0 | 4 | PolyFV | 1–4 | 2D Flat Line |
| 0 | 0 | 0 | 0 | 0 | 1 | x | 0 | x | x | 0 | 6 | PolyFZ | 1–6 | 3D Flat Line |
| 0 | 0 | 0 | 0 | 1 | 1 | x | 0 | x | x | 0 | 8 | PolyZGV | 1–8 | 3D Shaded |
| 0 | 0 | 0 | 0 | x | x | x | 0 | x | x | 1 | N | Polyline | 0 | |
| 0 | 0 | 0 | 1 | 0 | 0 | x | 0 | x | x | 0 | 12 | PolyFB | 1–12 | |
| 0 | 0 | 0 | 1 | 0 | 1 | x | 0 | x | x | 0 | 14 | PolyZF | 1–14 | |
| 0 | 0 | 0 | 1 | 1 | 1 | x | 0 | x | x | 0 | 16 | PolyZG | 1–16 | |
| 0 | 0 | 0 | 1 | 1 | 0 | x | 0 | x | x | 0 | 18 | PolyZGa | 1–18 | |
| 0 | 0 | 1 | 0 | 0 | 0 | 0 | 0 | 1 | 0 | 0 | 4 | BLITF1 | 1–4 | Data to Screen |
| 0 | 0 | 1 | 0 | 0 | 0 | 0 | 1 | 0 | 1 | 0 | 4 | BLITF2 | 1–4 | Data to Z-Buffer |
| 0 | 0 | 1 | 0 | 0 | 0 | 1 | 1 | 6 | 1 | 0 | 4 | BLITF3 | 1–4 | Data to Z&S |
| 0 | 0 | 1 | 0 | 0 | 1 | 0 | 0 | 1 | 0 | 0 | 5 | BLITF4 | 1–5 | Data to Host |
| 0 | 0 | 1 | 0 | 0 | 1 | 0 | 0 | 1 | 0 | 0 | 5 | BLITSS | 1–4, 21 | S(x/y) to S(lin) |
| 0 | 0 | 1 | 0 | 0 | 1 | 1 | 0 | 1 | 0 | 0 | 5 | BLITHH | 1–4, 21 | H(x/y) to H(lin) |
| 0 | 0 | 1 | 0 | 1 | 1 | 0 | 0 | 1 | 0 | 0 | 5 | BLITHS1 | 1–4, 21 | H(lin) to S(x/y) |
| 0 | 0 | 1 | 0 | 1 | 1 | 0 | 1 | 1 | 0 | 0 | 5 | BLITHS2 | 1–4, 21 | H(lin) to Z(x/y) |
| 0 | 0 | 1 | 0 | 0 | 0 | 1 | 0 | 1 | 0 | 0 | 5 | BLITSH1 | 1–4, 21 | S(x/y) to H(lin) |
| 0 | 0 | 1 | 0 | 0 | 0 | 1 | 1 | 1 | 0 | 0 | 5 | BLITSH2 | 1–4, 21 | Z(x/y) to H(lin) |
| 0 | 0 | 1 | 0 | 1 | 0 | 0 | 0 | 1 | 1 | 0 | 0 | BLITSZ1 | — | Blit Complex |
| 0 | 0 | 1 | 0 | 1 | 0 | 0 | 1 | 1 | 1 | 0 | 0 | BLITSZ2 | — | Polygonal Blit |
| 0 | 0 | 1 | 0 | 1 | 0 | 1 | 0 | 1 | 1 | 0 | 0 | BLITHHZ1 | 0 | (Not used) |
| 0 | 0 | 1 | 0 | 1 | 0 | 1 | 1 | 1 | 1 | 0 | 0 | BLITHHZ2 | 0 | (Not used) |
| 0 | 0 | 1 | 1 | 0 | 1 | 0 | 1 | 1 | 1 | 1 | N | SBLITHSS | 0 | String Blit |
| 0 | 0 | 1 | 1 | 1 | 1 | 0 | 0 | 1 | 1 | 1 | N | SBLITHSC | 0 | String Blit |
| 0 | 1 | 1 | a | a | a | a | V | V | V | V | V | Store | | |
| 0 | 1 | 0 | 0 | 0 | 1 | 0 | 0 | 0 | 0 | 0 | 0 | Idle | | |
| 0 | 1 | 0 | d | 0 | 0 | 0 | 1 | v | v | v | v | Branch | | |
| 0 | 1 | 0 | 0 | 0 | 0 | 1 | 0 | v | v | v | v | Call | | |
| 0 | 1 | 0 | 0 | 0 | 0 | 1 | 1 | — | — | 0 | 0 | Start | | |
| 0 | 1 | 0 | 0 | 0 | 0 | 0 | 0 | 0 | 0 | 0 | 0 | Return | | |
| 0 | 1 | 0 | 0 | 0 | 1 | 0 | 1 | — | — | 0 | 0 | Wait | | |
| 0 | 1 | 0 | 0 | 0 | 1 | 1 | 0 | — | — | 0 | 0 | IntOut | | |
| 0 | 1 | 0 | 1 | 0 | 1 | 1 | 1 | 0 | 0 | Q | 0 | Clear | | |
| 0 | 1 | 0 | 1 | 1 | 1 | 1 | 1 | 0 | 0 | 0 | 0 | Flush | | |
| 1 | 0 | a | a | a | a | a | a | V | V | V | V | Load Short | | |
| 1 | 1 | a | a | a | a | a | a | — | — | 1 | — | Load Long | | | where a value "x" indicates a don't care, a value "V" indicates a destination address and a value "a" defines an internal register address of the register file 205.

Figure 9:
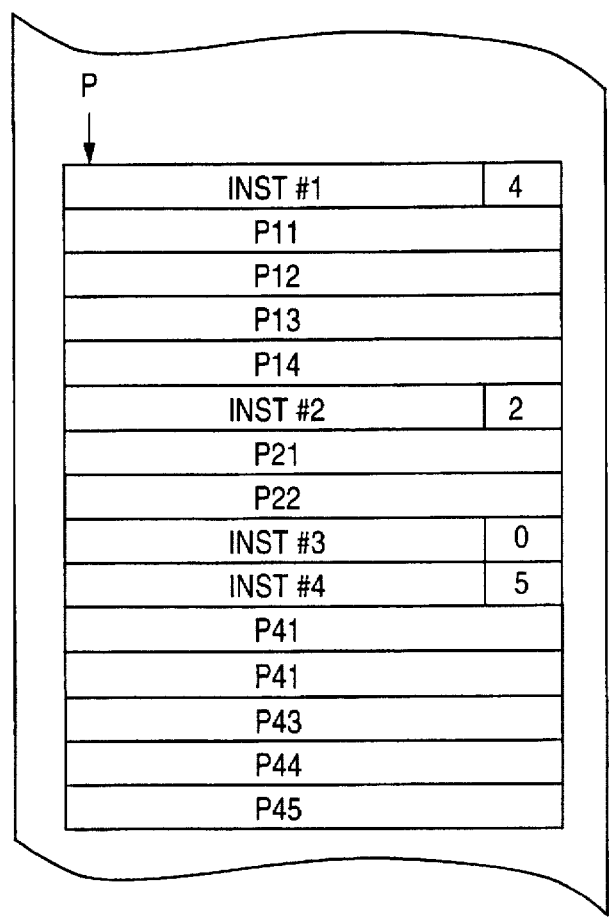
FIG. 9 illustrates the format of display list packets according to the present invention.

Referring now to FIG. 9, an example of the format of individual display list packets is shown. In particular, a plurality of display list commands are provided in sequential order within a memory such as the main memory 126 or the private memory 116. The packet P shown includes four separate instructions INST#1, INST#2, INST#3 and INST#4 and their associated parameters, where the A field of each of the instructions holds a number identifying the number of parameters following the particular instruction. In particular, INST#1 includes a value 4 in its A field, so that INST#1 is followed by four 32-bit parameters P11, P12, P13 and P14 associated with INST#1. INST#2 immediately follows P14 and has a value 2 within its A field, and thus is followed by two 32-bit parameters P21 and P22 associated with INST#2. INST#3 follows P22 and has a value of 0 loaded into its A field, indicating that INST#3 has no parameters. Immediately following INST#3 is INST#4 having a value of 5 loaded into its A field, so that it is immediately followed by five consecutive 32-bit parameters P41, P42, P43, P44 and P45 associated with INST#4. In this manner, it is seen that the display list packet protocol is address independent so that separate addresses need not be provided within the instructions since the addresses are based on the sequential structure of the display list packet. Since the graphics processor 100 expects that the display list packets are provided in sequential order, there is no need for any addresses provided within the instructions. Of course, certain instructions, such as the branch instruction, include embedded addresses allowing other devices such as the CPU 128 to control the graphics processor 100.

Figure 10:
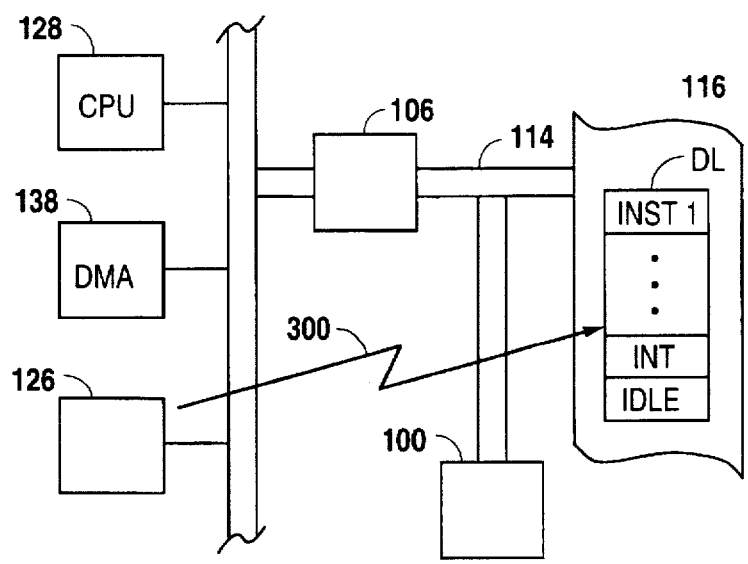
FIG. 10 is a figurative diagram illustrating general operation for transferring display list packets.

Referring now to FIG. 10, a figurative diagram is shown illustrating general operation of transferring display list packets from the main memory 126 to the private memory 116 and instructing the graphics processor 100 to begin executing the commands of the display list packet. In the preferred embodiment, the CPU 128 constructs a display list packet DL or series of commands within the main memory 126 and then transfers the display list packet DL to the private memory 116, where the CPU 128 performs the transfer operation itself or instructs the DMA 138 to do so. In particular, either the CPU 128 or the DMA device 138 gains control of the system bus 102 and the HBUS 114 and the graphics processor 100 is either executing a previously fetched instruction or is placed in idle or coprocessor mode. The CPU 128 or the DMA 138 then transfers the display list packet DL from the main memory 126 to the private memory 116 across the system bus 102 and the HBUS 114. Then the controlling device sends a control instruction, such as a branch instruction to the graphics processor 100 by loading the branch instruction into the instruction register of the graphics processor 100. The graphics processor 100 correspondingly switches into processor mode and retrieves the 24-bit address from the branch instruction and begins executing the list of instructions comprising a display list packet DL beginning at the indicated address within the private memory 116. At the end of the display list packet DL, the graphics processor 100 encounters an interrupt instruction and then an idle instruction causing the graphics processor 100 to assert the HINTOUT* signal, thereby informing the CPU 128 that the graphics processor 100 has executed all of the commands of the display list packet DL. The idle instruction causes the graphics processor 100 to enter the idle or coprocessor mode, whereby the graphics processor 100 then waits for further instructions from the CPU 128 and/or the DMA 138, such as another branch to another recently loaded display list.

It is noted that in processor mode the graphics processor 100 gains control of the HBUS 114 only so long as necessary to retrieve an instruction and its parameters within a display list. Then, the graphics processor 100 releases the HBUS 114 for control by an external device, such as the CPU 128 or the DMA 138, while the graphics processor 100 executes the fetched command. Such execution typically involves reading data from or writing data to the frame buffer 110 and/or the Z-buffer 122. Of course, if the command or instruction also indicates the need to read or write data to the private memory 116, the graphics processor 100 would have to maintain or regain control of the HBUS 114 temporarily. Nonetheless, for a substantial amount of time, the HBUS 114 is controlled by an external device while the graphics processor 100 is executing instructions. This provides a significant advantage of concurrency, further described below.

The use of the display list packet protocol allows a significant improvement in speed and efficiency when transferring data to the graphics subsystem across the system bus 102. This is especially advantageous if the bus system includes a relatively slow bus, such as the ISA bus operating at about 8 MHz capable of transferring only about 2 MB per second. The advantage is that only a small amount of data transfer is required for transferring commands as compared to the amount of data generated by the graphics processor 100 when executing those commands. If the host CPU 128 requires m cycles of the CK clock signal to generate a display list packet, the number of clock cycles to transfer the display list packet across the system bus 102 is approximately m/20 on the average. The graphics processor 100 consumes on the average of approximately 100 m cycles to execute the entire display list packet, thereby generating a substantial amount of data relative to the amount of data transferred across the system bus 102 in the form of display list commands. Thus, the present invention is used to substantially improve the performance of graphics subsystems of computer systems, especially persona/computer systems having relatively slow I/O buses.

Figure 11:
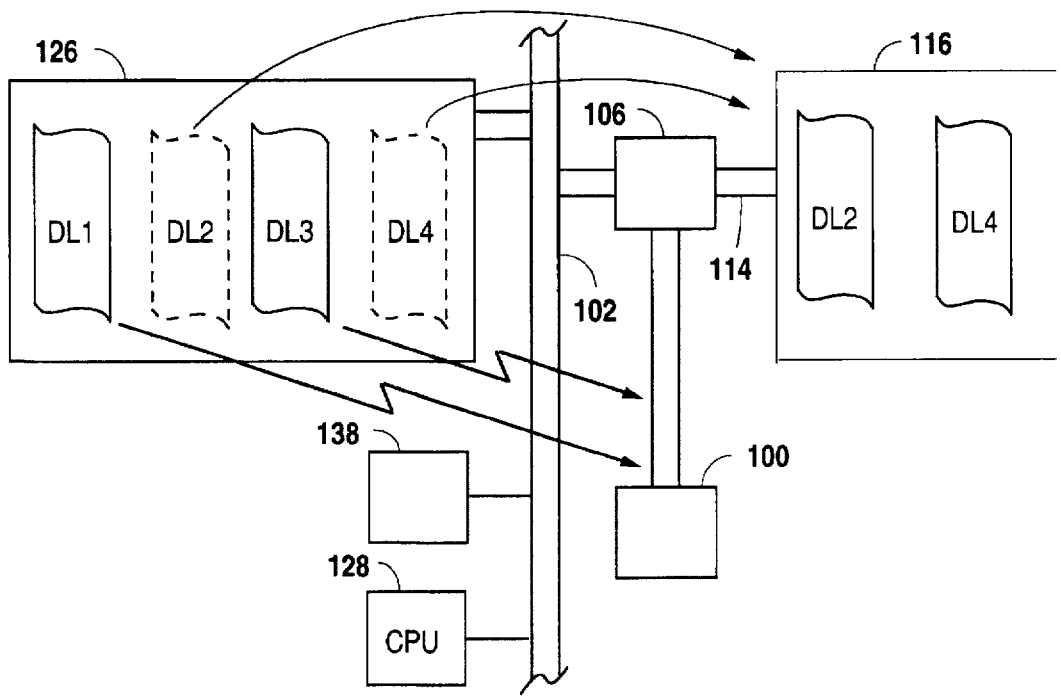
FIG. 11 is a figurative diagram illustrating execution of multiple display list packets in either processor or coprocessor mode as controlled by the host CPU of FIG. 1.

Referring now to FIG. 11, another figurative diagram is shown illustrating execution of multiple display list packets in either processor or coprocessor mode as controlled by the CPU 128. In particular, the CPU 128 builds four display list packets DL1, DL2, DL3 and DL4 in the system memory 126. The CPU 128 then instructs the DMA 138 to transfer display list packets DL2 and DL4 into the private memory 116 across the system bus 102. Of course, the DMA 138 first gains control of the HBUS 114 and then transfers the display list packets DL2 and DL4 into the private memory 116 as shown. Again, gain of control does not mean that the graphics processor 100 has to stop drawing or be in coprocessor mode. As described previously, the CPU 128 then sends a command to the graphics processor 100 to begin executing the respective commands of the display list packets DL2 or DL4, where the graphics processor 100 enters the processor mode and loads the first instruction of the display list packet DL2. The CPU 128 can also force the graphics processor 100 into coprocessor mode and transfer the display list packets DL1 and DL3 directly to the instruction register and register file 205 of the graphics processor 100. In this manner, it is clear that the application program and/or software driver executed by the CPU 128 defines the location of the display lists and whether the display lists are executed by the graphics processor 100 in processor or coprocessor mode. It is noted that the individual instructions of the display list packets DL1, DL2, DL3, DL4, etc. remain unchanged whether executed from the system memory 130 or the private memory 116. The CPU 128 can suspend operation of the graphics processor 100 by asserting the HINTIN* signal, where the graphics processor 100 immediately stops execution. To return the graphics processor 100 to its execution mode before being interrupted, the host CPU 128, or the DMA 138, performs a read from the status register within the register file 205 causing the graphics processor 100 to resume operation from the point of the interrupt.

Figure 12:
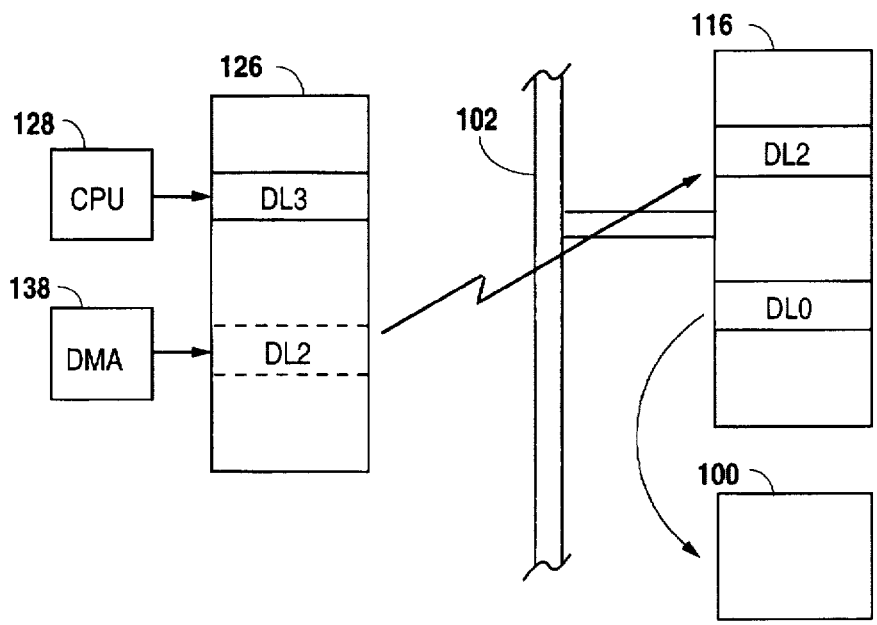
FIG. 12 is a figurative diagram illustrating concurrent execution of a system according to the present invention.

Referring now to FIG. 12, a figurative diagram is shown illustrating the concurrent execution capabilities of a system according to the present invention. In particular, the CPU 128 constructs a display list packet DL0 and transfers it to private memory 116 and then instructs the graphics processor 100 to execute the display list packet DL0. The graphics processor 100 sequentially loads the individual commands from the display list packet DL0 into its register file 205 while in processor mode and begins execution. Meanwhile, the CPU 128 builds a display list packet DL2 within main memory 126 and then instructs the DMA 138 to transfer the display list packet DL2 into the private memory 116 across the system bus 102. It is noted that system bus 102 is not controlled by the graphics processor 100 and the DMA 138 at exactly the same time. Nonetheless, once each individual instruction and the associated parameters from the display list packet DL0 is loaded into the register file 205, the graphics processor 100 can execute that command while the DMA 138 gains control of the system bus 102 and the HBUS 114 and transfers the display list packet DL2 into the private memory 116. Meanwhile, the CPU 128 begins construction of a new display list packet DL3 within the main memory 126. In this manner, the CPU 128, the DMA 138 and the graphics processor 100 are all executing concurrently on display list packets DL3, DL2 and DL0, respectively. It is noted that independent operations occur on the system bus 102 and the HBUS 114 due to isolation provided by the transceivers 106. Anytime a device on the HBUS 114 is not in control of the HBUS 114, the device tristates its control, address or data signals as appropriate to prevent signal contention conflicts. It is clear that the CPU 128, the DMA device 138 and the graphics processor 100 experience little if any wait states during concurrent execution in this manner.

Figure 13:
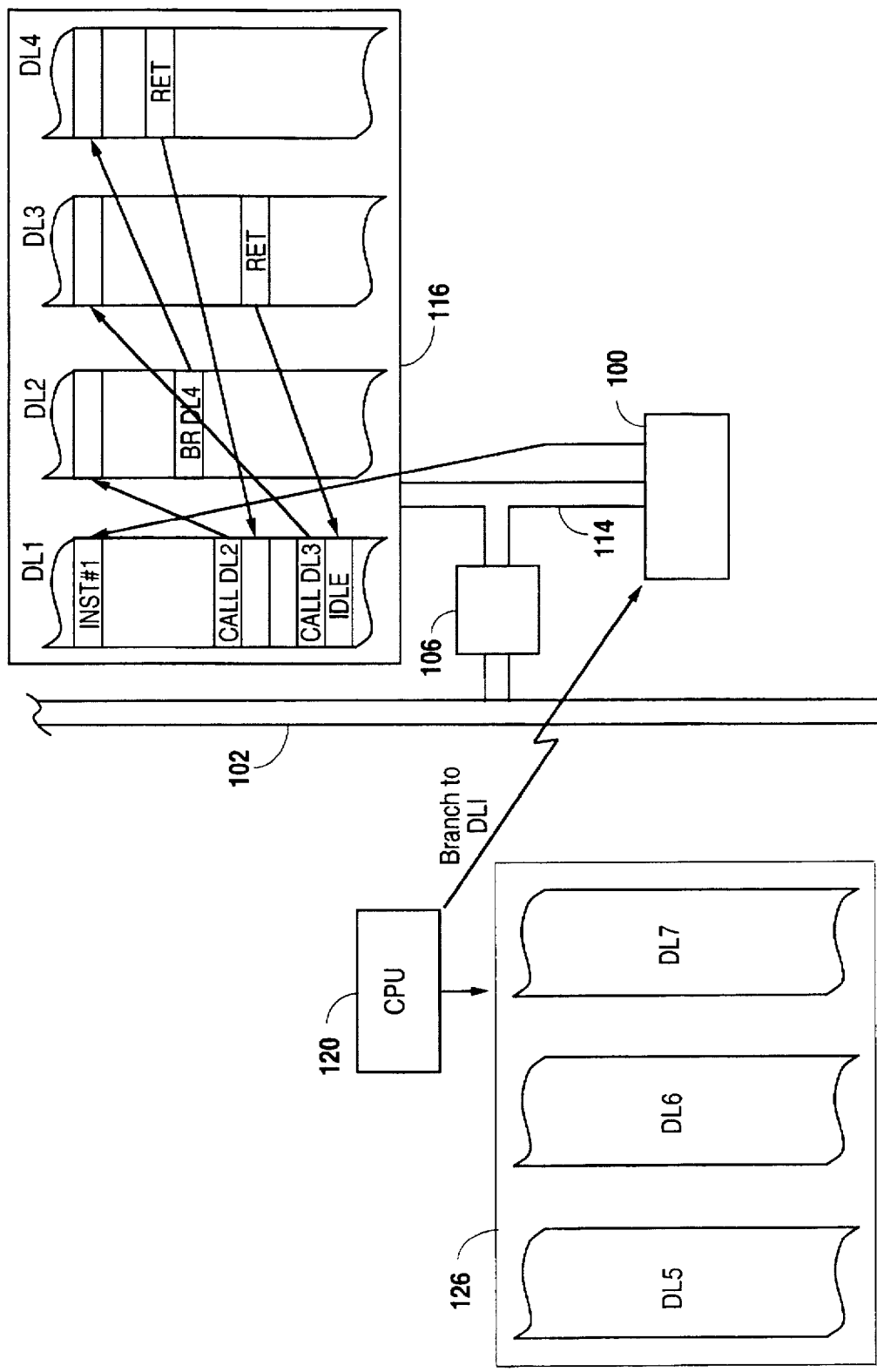
FIG. 13 is a figurative diagram illustrating the operation and efficiency of a system according to the present invention.

Referring now to FIG. 13, another figurative diagram is shown illustrating the efficiency of a system according to the present invention. The CPU 128 constructs multiple display list packets DL1, DL2, DL3, DL4, DL5, DL6, DL7, etc. within the main memory 126 and then instructs the DMA 138 to transfer particular ones of the display list packets, such as the display lists DL1, DL2, DL3 and DL4 as shown into the private memory 116. The display list packets DL1, DL2, DL3 and DL4 are important real-time instructions, such as a draw routine DL1, a save context display list packet DL2, a pop-down menu display list packet DL3 and a cursor display list packet DL4, which are executed by the graphics processor 100 directly from the private memory 116. The remaining display list packets DL5, DL6, DL7, etc. stay within the main memory 126, which include functions associated with fonts, image rotate commands or other functions that are non-critical and that need not be loaded into the private memory 116 while the application is running.

In particular, after the display list packets DL1, DL2, DL3 and DL4 are loaded into the private memory 116, the CPU 128 executes a branch instruction to the graphics processor 100 while in coprocessor mode which causes the graphics processor 100 to enter processor mode and begin executing the first instruction from the display list packet DL1. The graphics processor 100 continues executing consecutive instructions from the display list packet DL1 until it encounters a call instruction, instructing the graphics processor 100 to transfer execution to the beginning of the save context display list packet DL2. As described previously, the graphics processor 100 saves the next address after the call instruction within the display list packet DL1 into its internal stack and then loads the address from the call instruction into its PC and begins executing from the top or beginning of the display list packet DL2. Then the graphics processor 100 encounters a branch instruction while executing the display list packet DL2, which instructs the graphics processor 100 to begin executing at the beginning of the cursor display list packet DL4. The branch includes the address pointing to the beginning of the cursor display list packet DL4. Thus, the graphics processor 100 retrieves the branch address and begins executing from the beginning of the cursor display list packet DL4 until encountering a return instruction. The return instruction corresponds to the call instruction encountered in the draw routine display list packet DL1 since that was the last call instruction executed. This causes the graphics processor 100 to pop the value from its internal stack and begin executing with the next instruction after the last call instruction within the draw routine display list packet DL1. Thus, the graphics processor 100 returns to the draw routine display list packet DL1 and begins executing instructions from that point.

The graphics processor 100 then encounters another call instruction within the draw routine display list packet DL1 similar to the call instruction previously encountered, causing the graphics processor 100 to begin execution of the pop-down display list packet DL3 at the beginning of the pop-down display list packet DL3. The graphics processor 100 executes the entire display list packet DL3 until encountering a return instruction causing the graphics processor 100 to execute the next instruction after the previous call instruction, which in this case is an idle instruction. Upon encountering the idle instruction, the graphics processor 100 switches to the idle or coprocessor mode and waits for further instructions from the CPU 128. Of course, an interrupt instruction could also be inserted to interrupt the host CPU 128 upon reaching the idle state. In this manner, an entire operation indicated by the display list packets DL1, DL2, DL3 and DL4 is completely executed by a single branch instruction from the CPU 128. Meanwhile, the host CPU 128 can construct further display list packets or can interrupt the graphics processor 100 at any time to execute any of the display list packets DL5, DL6, DL7, etc.

Figure 14:
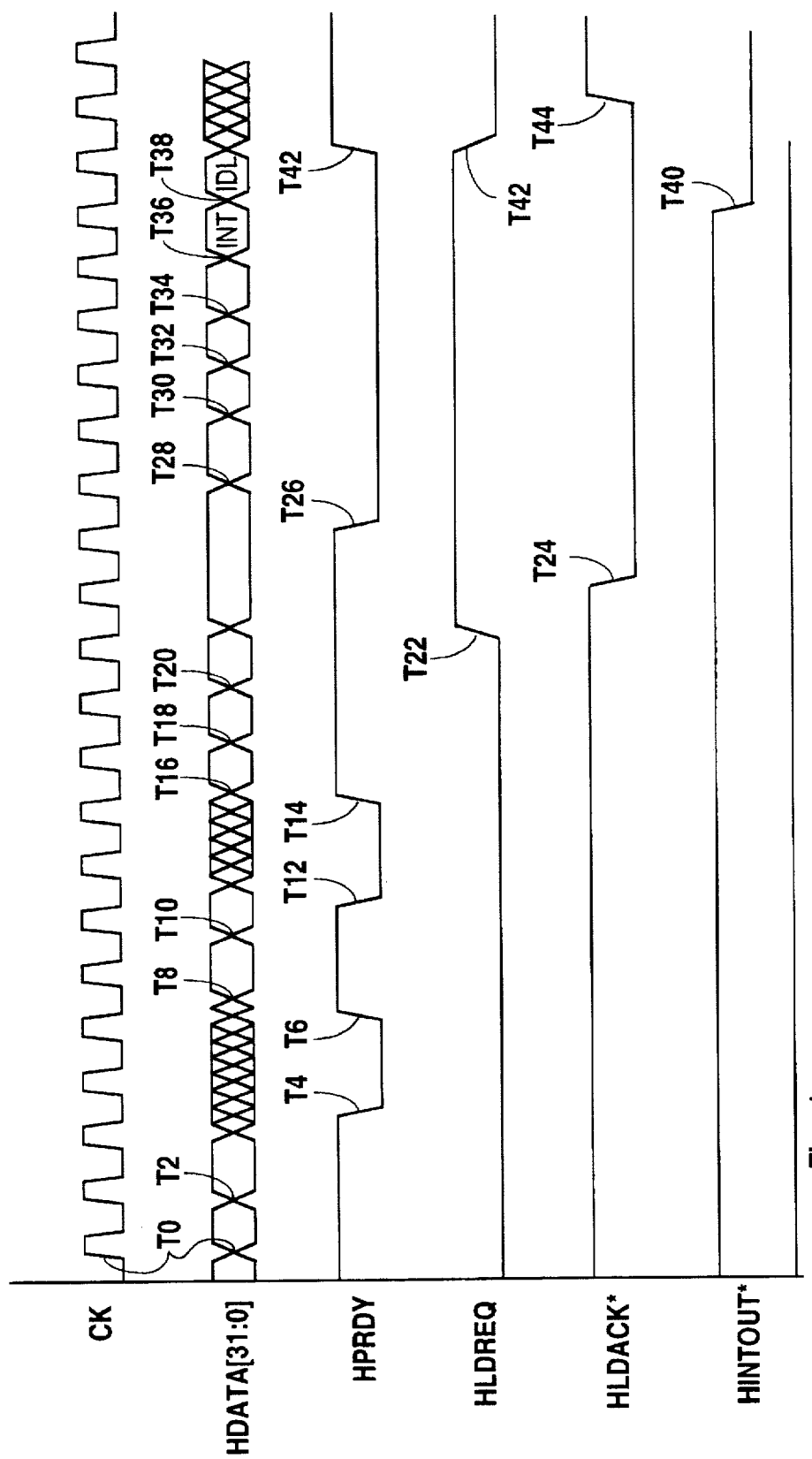
FIG. 14 is a timing diagram illustrating the handshaking between the host CPU and the graphics processor of FIG. 1.

Referring now to FIG. 14, a timing diagram is shown illustrating the handshaking between processor and coprocessor modes of the graphics processor 100. The signals shown include the primary clock signal CK, the host data bus HDATA[31:0], the HPRDY, the HLDREQ signal asserted by the graphics processor 100 for requesting access to the HBUS 114, the HLDACK* signal asserted by the CPU 128 indicating granting control of the HBUS 114 to the graphics processor 100 and the HINTOUT* signal indicating an interrupt asserted by the graphics processor 100 to interrupt the CPU 128. Timing is shown beginning at a time T0 while the graphics processor 100 is in coprocessor mode and receiving instructions and parameters from the CPU 128. The graphics processor 100 first operates in coprocessor mode to allow full control by the application program. Data sets are asserted on the host data bus at times T0 and T2 and the graphics processor negates the HPRDY signal at a time T4 to temporarily stall the CPU 128 indicating it is not ready to accept more data. The graphics processor 100 asserts the HPRDY signal at a time T6 indicating it is ready for more data, and the CPU 128 provides more data beginning at times T8 and T10, respectively. Again, the graphics processor 100 negates the HPRDY signal at a time T12, indicating it is unable to receive more data. Again, the host CPU 128 suspends writing data until it detects the HPRDY signal high again at a time T14. In response, the host CPU 128 asserts new data sets at time T16, T18 and T20. Up to this point the graphics processor 100 has been operating in coprocessor mode, which may be desirable for maintaining complete control over the graphics processor 100.

The data set asserted at time T20 is a branch instruction indicating that the graphics processor 100 should enter processor mode and begin execution at the indicated address. In response, the graphics processor 100 asserts the HLDREQ signal at a time T22 to gain access of the HBUS 114 from the CPU 128. The CPU 128 responds at a time T24 by asserting the HLDACK* signal low and the graphics processor 100 correspondingly asserts the HPRDY signal low at a time T26, indicating it has control of the HBUS 114 and will accept no data from the bus interface. At this time, the graphics processor 100 has switched to the processor mode and begins executing instructions from the private memory 116. Data sets are asserted on the host data bus of the HBUS 114 as indicated beginning at times T28, T30, T32, T34, T36 and T38, where the graphics processor 100 is retrieving instructions and corresponding parameters from the private memory 116 and correspondingly executing these instructions.

The data set asserted at time T36 is an interrupt instruction causing the graphics processor 100 to assert the HINTOUT* signal at time T40. The graphics processor 100 fetches an idle instruction at time T38 and reenters the coprocessor mode. Subsequently, at a time T42, the graphics processor asserts the HPRDY signal and negates the HLDREQ signal indicating it has completed the series of instructions and is ready to receive more data and instructions from the CPU 128. It is noted that the HPRDY and HLDREQ signals are not necessarily toggled at the same time, but is shown as such for purposes of simplification. The CPU 128 responds at a subsequent time T44 by negating the HLDACK* signal and retaining control of the HBUS 114 for providing more data and instructions to the graphics processor 100, which is now in the coprocessor mode.

Figure 15:
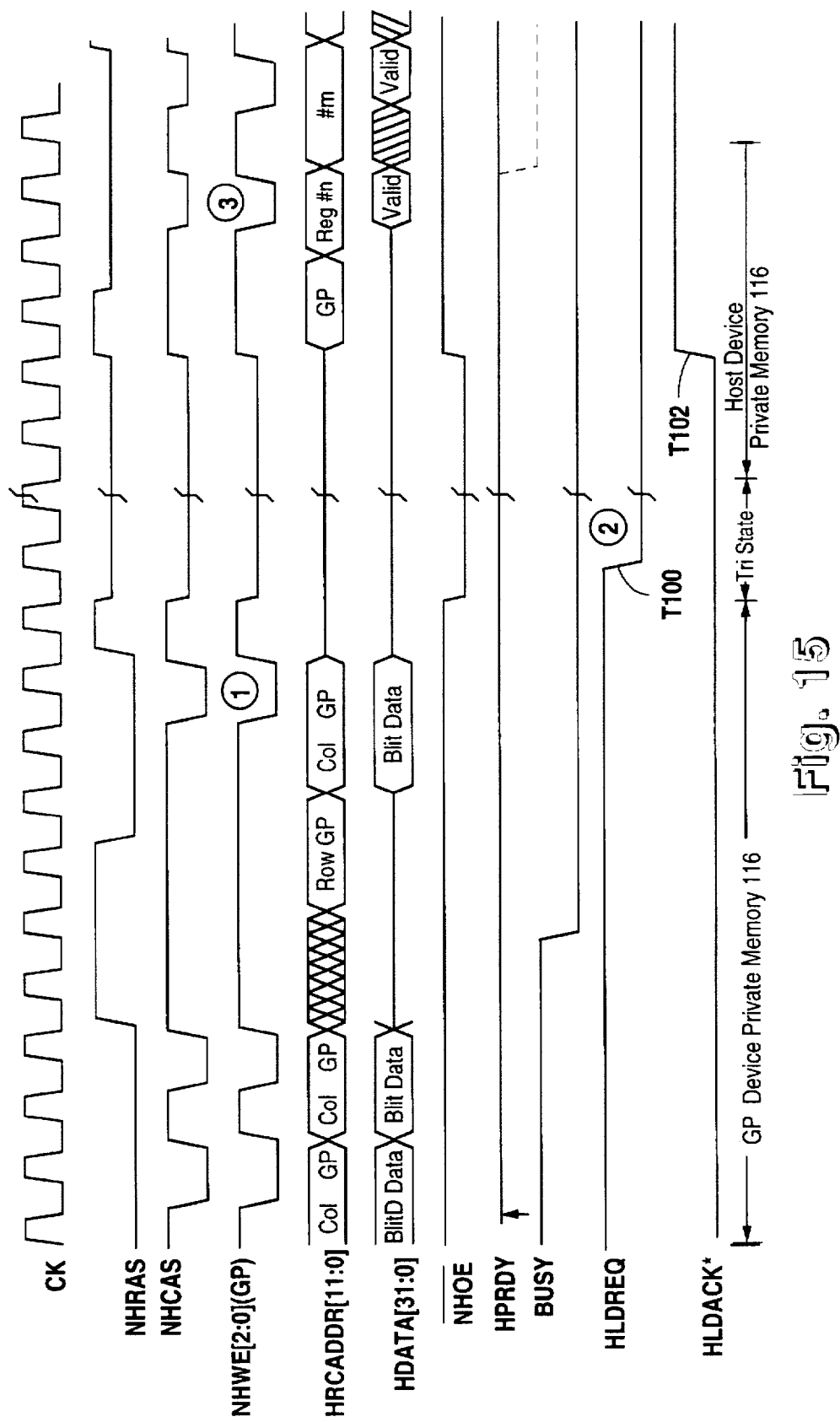

FIGS. 15 and 16 are more accurate timing diagrams provided for purposes of illustration. In particular, FIG. 15 illustrates the processor to coprocessor mode timing where the graphics processor 100 is operating in processor mode and then negates the HLDREQ signal at a time T100, at which time a transitional state occurs. This shows how the graphics processor 100 only accesses the memory during instruction reads, then gets off the HBUS 114 so the CPU 128 can access the private memory 116. The graphics processor 100 then re-arbitrates for the HBUS 114 to read another display list instruction. The CPU 128 negates the HLDACK* signal at a time T102 to gain control of the HBUS 114, where the graphics processor 100 is in processor mode, but releases control of the HBUS 114 during instruction execution. FIG. 16 illustrates coprocessor mode timing of the graphics processor 100 where the CPU 128 or the DMA 138 has control of the HBUS 114 and is feeding instructions and parameters to the graphics processor 100.

It is now appreciated that a processor and system according to the present invention provides superior graphics processing capability for a computer system, particularly a personal computer system. Display list packets comprising multiple sequential commands associated with certain functions or operations are generated by a host CPU executing an application software program and/or system driver. The display list commands and packets are fed to the graphics processor directly in a coprocessor mode, or an instruction is sent to command the graphics processor to switch to processor mode and retrieve the display list packets itself. Those commands requiring higher speed, such as those requiring execution in real time, are transferred by the CPU or a DMA device into local memory of the graphics processor. The display list packets are preferably linked together for performing necessary functions of a plurality of operations as initiated by a single command from the host CPU. Due to the sequential structure of the display list packet protocol, separate addresses are not required so that it is relatively address-independent. Furthermore, each command allows complex graphics function reducing bandwidth requirements of the system bus.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system, comprising:

a system bus;

system memory coupled to said system bus;

a local bus;

a set of transceivers coupled to said system and local buses for allowing data transfer;

a first processor coupled to said system bus for generating display list commands and for storing said display list commands into said system memory; and a display list processor coupled to said local bus for executing said display list commands directly from said system memory in a processor mode or indirectly executing said commands in a coprocessor mode wherein said first processor controls said local bus and feeds said display list commands to said display list processor.

2. The computer system of claim 1, further comprising a local memory coupled to said local bus.

3. The computer system of claim 2, further comprising means coupled to said system bus for transferring selected ones of said display list commands to said local memory.

4. The computer system of claim 3, wherein said first processor generates and stores display list commands into said system memory while said transferring means transfers selected ones of said display list commands from said system memory to said local memory and while said second processor loads and executes display list commands from said local memory.

5. The computer system of claim 3, wherein said transferring means comprises a direct memory access device.

6. The computer system of claim 2, wherein said first processor directs that certain ones of said display list commands are transferred to said local memory for execution by said display list processor in processor mode.

7. The computer system of claim 1, wherein said display list commands are grouped into display list packets, wherein each display list packet comprises a plurality of display list commands associated with a particular function.

8. The computer system of claim 7, wherein said display list commands include branching instructions for linking associated ones of said display list packets together.

9. The computer system of claim 1, wherein said display list processor includes:

a register file including an instruction register; and control logic coupled to said register file for reading an instruction within said instruction register and for dynamically switching between said processor and coprocessor modes based on said display list commands read by said control logic.

10. The computer system of claim 1, wherein said display list commands include a parameter field specifying a number of parameters associated with said command stored in consecutive memory locations in said system memory.

11. In a computer system including a graphics processor and memory, a method of processing graphics commands comprising the steps of:

storing display list packet commands in the memory, each command including an opcode field identifying command type and a parameter field identifying a number of associated parameters;

loading selected ones of the display list packet commands into the graphics processor operating in coprocessor mode, the graphics processor immediately executing each loaded command in coprocessor mode; and one of said loaded commands providing an address and instructing the graphics processor to branch to the address and begin executing display list packet commands, wherein the graphics processor dynamically switches to a processor mode and begins executing the commands beginning at the specified address.

12. The method of claim 11, wherein the computer system includes a local memory and wherein the display list commands are initially stored in system memory, before said step of instructing, further comprising the step of:

transferring selected ones of the display list packet commands to an address in the local memory.

13. The method of claim 12, further comprising the steps of:

storing additional display list packet commands in the system memory and transferring commands into the local memory while the graphics processor executes the selected display list packet commands.

14. The method of claim 11, wherein said step of executing the display list commands comprises the steps of retrieving the number of associated parameters from consecutive locations in the addressing scheme according to the parameter field.

15. A computer system, comprising:

a bus;

a memory coupled to said bus that stores a plurality of display list commands;

a display list processor coupled to said bus that executes said display list commands in a processor mode by directly accessing said memory and loading said commands or that receives said commands and executes said commands in a coprocessor mode; and means for controlling said bus and accessing said commands and providing said commands to said display list processor while operating in said coprocessor mode.

16. The computer system of claim 15, further comprising means coupled to said bus for generating said display list commands and for loading said commands into said memory.

17. The computer system of claim 15, wherein said display list processor includes:

a register file including an instruction register; and control logic coupled to said register file for reading an instruction within said instruction register and for dynamically switching between said processor and coprocessor modes based on said instructions read by said control logic.

18. The computer system of claim 15, wherein said controlling means comprises a host processor.

19. The computer system of claim 15, wherein said controlling means comprises a direct memory access device.

20. The computer system of claim 15, wherein said display list commands are grouped into display list packets, wherein each display list packet comprises a plurality of display list commands associated with a particular function.

21. The computer system of claim 15, wherein each one of said display list commands includes a parameter field specifying a number of parameters associated with that command, wherein said parameters are stored in consecutive locations in said memory following said command.

22. The computer system of claim 15, wherein each one of said display list commands includes an opcode field for specifying one of a plurality of command types.

23. The computer system of claim 15, wherein said display list processor is a graphics processor and said display list commands are graphics commands.

24. The computer system of claim 15, wherein said display list commands are the same format for said processor and coprocessor modes of execution.

* * * * *